United States Patent [19]

Sarraf

[11] Patent Number: 5,625,402

[45] Date of Patent: Apr. 29, 1997

[54] DIGITAL PRINTERS USING MULTIPLE LASERS OR LASER ARRAYS WITH DIFFERENT WAVELENGTHS

[75] Inventor: Sanwal P. Sarraf, Webster, N.Y.

[73] Assignee: Eastman Kodak Company, Rochester, N.Y.

[21] Appl. No.: 54,486

[22] Filed: Apr. 30, 1993

[51] Int. Cl.$^6$ .................................... B41J 2/455; B41J 2/47
[52] U.S. Cl. ............................ 347/232; 347/241; 347/244
[58] Field of Search ........................... 346/107 R, 108; 347/232, 115, 241, 243, 244, 118

[56] References Cited

U.S. PATENT DOCUMENTS

| | | | |
|---|---|---|---|
| 4,494,865 | 1/1985 | Andrus et al. | 355/32 |
| 4,576,891 | 3/1986 | Adair et al. | 430/138 |
| 4,651,170 | 3/1987 | Chandler et al. | 346/108 |
| 4,740,809 | 4/1988 | Yamamoto et al. | 350/27 |
| 4,806,446 | 2/1989 | Hatta et al. | 430/138 |
| 4,816,367 | 3/1989 | Sakojiri et al. | 430/138 |
| 4,821,113 | 4/1989 | McQuade et al. | 346/108 X |
| 4,832,426 | 5/1989 | Käser | 359/19 |
| 4,840,866 | 6/1989 | Kovacs et al. | 430/138 |
| 4,842,976 | 6/1989 | Sanders et al. | 430/138 |
| 4,847,661 | 7/1989 | Ueda et al. | 355/27 |
| 4,891,661 | 1/1990 | Tanaka et al. | 355/27 |
| 4,895,790 | 1/1990 | Swanson et al. | 430/321 |
| 4,910,116 | 3/1990 | Nakai et al. | 430/138 |
| 4,924,321 | 5/1990 | Miyagawa et al. | 346/108 X |
| 5,053,309 | 10/1991 | Sanders et al. | 430/138 |
| 5,059,506 | 10/1991 | Mori et al. | 430/138 |
| 5,099,358 | 3/1992 | Okazaki | 359/503 |
| 5,122,432 | 6/1992 | Hamman, IV et al. | 430/138 |
| 5,475,415 | 12/1995 | Noethen | 347/241 |

*Primary Examiner*—Benjamin R. Fuller
*Assistant Examiner*—David Yockey
*Attorney, Agent, or Firm*—Svetlana Z. Short

[57] ABSTRACT

Laser color printers include multiple laser sources formed of either diode lasers or laser diode arrays emitting light beams of different wavelengths, and an optical arrangement. The optical arrangement independently processes each of the light beams to provide a separate predetermined sized collimated light beam, and then focuses and scans the light beams over a printing media that prints separate colors for each different wavelength of light. Where different sized collimated light beams are required to match a printing media, a separate zoom lens is used is used in the optical arrangement to independently reshape each of two orthogonal cross-sectional directions of a separate one of the light beams before being properly sized at the output thereof. Where only one of the two orthogonal cross-sectional directions of the light beams has to be reshaped, the light beams are collimated and combined and pass through a beam shaper which reshapes that cross-sectional direction of the light beams before the light beams are focused and scanned over the printing media. Where laser diode arrays are used to generate separate wavelength light beams, each of the light beams from the lasers of an array are formed and focused into a linear array of spots on the printing media.

4 Claims, 4 Drawing Sheets

1

DIGITAL PRINTERS USING MULTIPLE LASERS OR LASER ARRAYS WITH DIFFERENT WAVELENGTHS

FIELD OF THE INVENTION

The present invention relates to laser color printers, and more particularly, to laser color printers using multiple lasers or laser arrays emitting separate light beams of different wavelengths that are each optically processed, focused, and scanned over a printing media.

BACKGROUND OF THE INVENTION

In recent years, thermal transfer systems have been developed to obtain prints from pictures which, for example, have been generated electronically from a color video camera. According to one way of obtaining such prints, an electronically generated picture is first subjected to color separation by color filters to obtain, for example, three color-separated images. The respective color-separated images are then converted into three separate electrical signals. These three electrical signals are then operated on to produce representative cyan, magenta, and yellow electrical signals which are transmitted to a thermal printer. To obtain the print, a cyan, magenta, or yellow dye-donor element or sheet is placed face-to-face with a dye receiving element or sheet. The dye-donor element and the dye receiving element are then inserted between a thermal printing head and a platen roller or drum. A linear thermal printing head is used to apply selective heat from the back of the dye donor sheet to cause the dye from the dye donor element of the printing media to be released to reproduce the image portion of one color. The process is then repeated for the other two colors using any known accurate registration technique for ensuring that the corresponding pixels of each color image are properly registered to produce a sharp image print.

Another way to thermally obtain a print using the electronic signals described above is to use one or more lasers instead of a thermal printing head. In such a laser printing system, the dye-donor sheet includes a material which strongly absorbs light at the wavelength of the laser being used. When the dye-donor sheet is irradiated, the absorbing material converts light energy to thermal energy and transfers the heat to the dye in the immediate vicinity, thereby heating the dye to its vaporization temperature for transfer to the dye receiver sheet. The light absorbing material is generally present in a layer beneath the dye and/or admixed with the dye. The laser beam is modulated by the electrical signals which are representative of the shape and color of the original image so that each dye color is heated to cause volitization only in those areas where its presence is required on the dye receiver member to reconstruct the color of the original image. Various printing media have been developed for use with laser printers.

U.S. Pat. No. 4,816,367 (H. Sakojiri et al.), issued on Mar. 28, 1989, discloses a multicolor imaging material comprising a substrate, and a capsule layer made up of (a) a plurality of heat-meltable microcapsules including separate color formers for three primary colors, and (b) a developer layer. FIG. 7 of this patent shows a laser printing arrangement comprising three lasers that generate separate light beams of different wavelengths and beam combining means. This laser printing arrangement merely provides a simple tool for combining light beams of three different wavelengths for projection onto the multicolor imaging material. More particularly, the three laser light beams having separate wavelengths are applied to the multicolor imaging material in accordance with electrical laser modulating input signals corresponding to the three primary colors of an original image. In response to the laser light beams, the heat-meltable microcapsules for the individual colors independently generate heat causing the heat-meltable substance to be selectively melted or not melted and produce correspondingly colored pixels of the original image on the imaging material. Another example of a similar type one-microcapsule layer color imaging materials is given in U.S. Pat. No. 5,053,309 (F. Sanders et al.), issued on Oct. 1, 1991.

U.S. Pat. No. 5,122,432 (W. Hammann IV et al.), issued on Jun. 16, 1992, discloses a photosensitive printing media including a support, and a plurality of microcapsule sets and a color correction dye associated with the sets of microcapsules mounted in layers on the support. In one embodiment, a first layer including microcapsules of a first color dye surrounded by, or adjacent to, a layer of a color correction dye which absorbs light within a spectral sensitivity range of the first color microcapsules is formed on the support, and a second layer including microcapsules of one or more second colors surrounded by, or adjacent to, a layer of an appropriate color correction dye is formed on the first layer. In a second embodiment, a first layer comprising a first set of microcapsules that are sensitive to red light and a layer of cyan color correction dye is formed on the support, a second layer comprising a second set of microcapsules that are sensitive to green light and a layer of an magenta color correction dye is formed on the first layer, and a third layer comprising a third set of microcapsules that are sensitive to blue light and a layer of a yellow color correction dye are formed on the second layer. The color correction dyes each absorb at least one of the red, green, or blue light.

Referring now to FIG. 1, there is shown a printing media 10 which is disclosed in U.S. patent application Ser. No. 992,235, now U.S. Pat. No. 5,234,890 (assigned to the present assignee), filed on Dec. 17, 1992. The printing media 10 comprises a multicolor, multilayer dye donor element 12 for laser induced thermal dye transfer to a receiver member 14. The dye donor element 12 comprises a support 16 having formed thereon three layers of microcapsules (beads) 17, 18, and 19 on top of each other with each layer containing a different colored dye. More particularly, each microcapsule dye layer comprises solid, homogeneous beads which contain an image dye, a binder, and a laser light-absorbing material which is sensitized to a different wavelength of light. It is to be understood that the printing media 10 need not always contain three dye layers, and can comprise any number of two or more dye layers formed on the support 16 for laser induced dye transfer using light beams of different wavelengths.

It is to be understood that in the various printing media known in the prior art, the microcapsules or beads containing the dye of each of two or more colors may or may not have a same size, and/or may or may not have a same sensitivity or behavior with a particular wavelength light associated therewith. The problem is that the prior art laser printers provide arrangements which are not designed in accordance with specific parameters of a color printing media. In other words, the prior art laser printers only provide general tools for multicolor printing and do not consider or provide compensation for parameter variations of different printing media. As a result, the prior art laser printers cannot efficiently transfer two or more different dyes from a dye donor member to a dye receiving member using different wavelength laser light beams.

Therefore, it is desirable to provide laser printers which emit light beams of different wavelengths that are optically processed and scanned to provide selective sized focused beams at a printing media being used and thereby efficiently match the separate color parameters of the printing media.

SUMMARY OF THE INVENTION

The present invention is directed to laser color printers using multiple lasers or laser arrays emitting light beams of different wavelengths that are each optically processed to provide selective sized focused light beams which (a) efficiently match the separate color parameters of the printing media, and (b) are scanned over a printing media to print a desired multicolor image.

Viewed from one aspect, the present invention is directed to laser color printer for printing a multicolor image on a light sensitive color printing media that is responsive to separate wavelengths of light for each different color printed thereon comprising a plurality of laser light sources, and an optical system. Each of the plurality of laser light sources is adapted to generate a light beam of a different wavelength from each of the other laser light sources. The optical system comprises first optical means and second optical means. The first optical means separately selectively collimates each of the different wavelength light beams to provide a predetermined cross-sectional sized intermediate light beam. The second optical means combines and focuses the different wavelength intermediate light beams after being combined for scanning over the printing media.

Viewed from another aspect, the present invention is directed to a laser color printer for printing a multicolor image on a light sensitive color printing media that is responsive to separate wavelengths of light for each different color printed thereon comprising a plurality of laser light sources, and an optical system. Each of the plurality of laser light sources are adapted to generate a light beam of a different wavelength from each of the other laser light sources. The optical system independently collimates and reshapes each of the different wavelength light beams to provide a predetermined separate cross-sectional sized intermediate light beam. The optical system then combines the intermediate light beams to a common area along their paths before focusing the different wavelength intermediate light beams for scanning over the printing media.

The invention will be better understood from the following more detailed description taken with the accompanying drawings and claims.

The drawings are not necessarily to scale.

DETAILED DESCRIPTION

It is to be understood that corresponding designation numbers are used in the various figures for corresponding elements that have the same function. For purposes of explanation only, the laser printers in accordance with the present invention will be described using three lasers for generating three separate light beams of different wavelengths for printing a color image on a light sensitive printing media. However, the laser printers of the present invention can comprise any number of two or more lasers for generating a corresponding number of laser beams of different wavelengths in order to print a color image.

Figure 2:
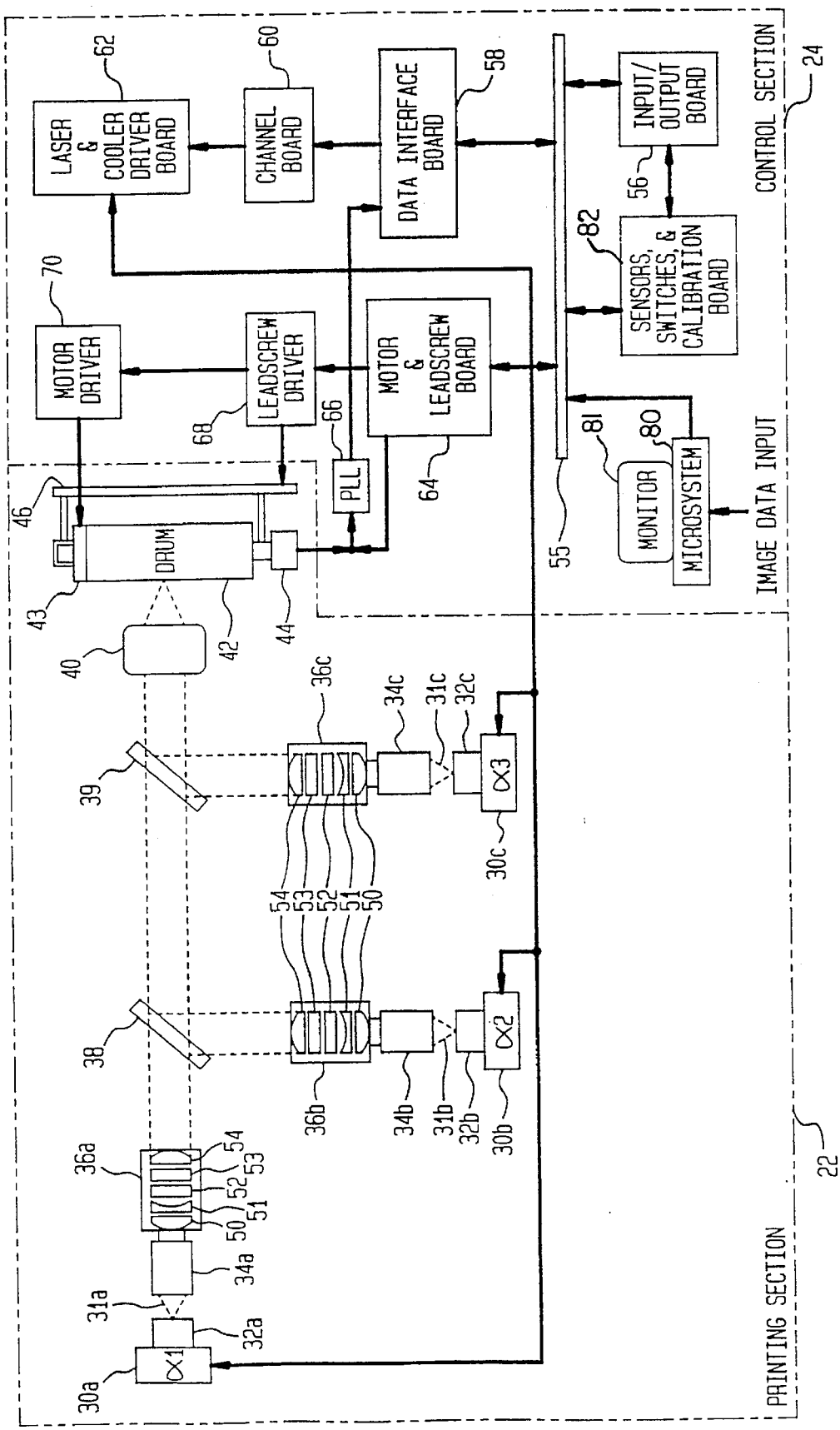
FIG. 2 shows a block diagram of a laser printer comprising a printing section and a control section in accordance with a first embodiment of the present invention.

Referring now to FIG. 2, there is shown a block diagram of a laser printer 20 in accordance with a first embodiment of the present invention. The laser printer 20 comprises a printing section 22 (shown within a first dashed line area), and a control section 24 (shown within a second dashed line area) for controlling the printing section 22.

The printing section 22 comprises a plurality of three lasers 30a, 30b, and 30c which are adapted to generate modulated light beams 31a, 31b, and 31c, respectively, (shown as dashed line paths) at respective first ($\alpha$1), second ($\alpha$2), and third ($\alpha$3) different wavelengths, a plurality of three coolers 32a, 32b, and 32c, a plurality of three collimating lenses 34a, 34b, and 34c, a plurality of three zoom lenses 36a, 36b, and 36c, a first dichroic beam combiner 38, a second dichroic beam combiner 39, a focusing lens arrangement 40, a drum 42 driven by a motor 43, an encoder 44, and a leadscrew 46 for laterally moving the drum 42 relative to the focusing lens arrangement 40.

The lasers 30a, 30b, and 30c are associated with the three coolers 32a, 32b, and 32c, respectively, which maintain the lasers 30a, 30b, and 30c at a predetermined temperature range during a printing operation. Preferably, the lasers 30a, 30b, and 30c simultaneously generate the modulated light beams 31a, 31b, and 31c. More particularly, the laser 30a generates the modulated light beam 31a at a first wavelength $\alpha$1 which is collimated by the collimating lens 34a and directed into the zoom lens 36a. The laser 30a generates the modulated light beam 31b at a second wavelength $\alpha$2 which is collimated by the collimating lens 34b and directed into the zoom lens 36b. The laser 30c generates the modulated light beam 31c at a third wavelength $\alpha$3 which is collimated by the collimating lens 34c and directed into the zoom lens 36c.

The zoom lenses 36a, 36b, and 36c receive the collimated input light beams 31a, 31b, and 31c, respectively, and produce therefrom the respective output light beams 31a, 31b, and 31c with selective predetermined sizes in each of two orthogonal cross-sectional directions. Each of the zoom lenses 36a, 36b, and 36c is shown as comprising a sequence of a first cylindrical convex lens 50, a first cylindrical concave lens 51, a second cylindrical convex lens 52, a second cylindrical concave lens 53, and a double spherical convex lens 54. The cylindrical lenses 50 and 51 are arranged to have a power (ability to change direction of light rays) in only a first cross-section direction of the light beams 31a, 31b, or 31c, and the cylindrical lenses 52 and 53 are arranged to have a power in only a second cross-sectional direction of the light beam 31a, 31b, or 31c which is orthogonal to the first cross-sectional direction. The spherical lens 54 has a predetermined power in both the first and second orthogonal cross-sectional directions. The combination of the lenses 50 and 51, in conjunction with the cylindrical portion of the spherical lens 54 in the first cross-sectional direction, operate to provide an appropriately collimated and a selectively sized output light beam 31a, 31b, or 31c from the zoom lens 36a, 36b, or 36c, respectively, in the first cross-sectional direction of the associated light beam. Similarly, the combination of the lenses 52 and 53, in conjunction with the cylindrical portion of the spherical lens 54 in the second cross-sectional direction, operate to provide an appropriately collimated and a selectively sized output light beam 31a, 31b, or 31c from the zoom lens 36a, 36b, or 36c, respectively, in the second orthogonal cross-sectional direction of the associated light beam. It should be understood that spherical lens 54 is a common lens to each of the pair of lenses 50-51 and 52-53 and can be split into two cylindrical lenses (not shown) so that a first one of the such cylindrical lenses and the cylindrical lenses 50 and 51 operate to properly collimate and selectively size the associated light beam 31a, 31b, or 31c in the first cross-sectional direction. Concurrently, the other cylindrical lens (from the split of lens 54) and the cylindrical lenses 52 and 53 operate to properly collimate and selectively size the associated light beam 31a, 31b, or 31c in the second cross-sectional direction.

More particularly, the zoom lenses 36a, 36b, and 36c, have the advantages of being able to (a) decouple the light in the first and second orthogonal cross-sectional directions in the associated light beam 31a, 31b, or 31c and independently change the size of the collimated output beam in each of the first and second orthogonal cross-sectional directions to get separate sized output light beams 31a, 31b, and 31c, (b) correct for any astigmatism in the light beams 31a, 31b, and 31c by the separate processing of the decoupled light in the two orthogonal cross-sectional directions, and (c) accommodate lasers 30a, 30b, and 30c of different types or parameters such as divergence, and/or different sized collimated light beams 31a, 31b, and 31c.

It is to be understood that a top view of each of the zoom lenses 36a, 36b, and 36c is shown in FIG. 2, and that the lenses 52 and 53 of each of the zoom lenses 36a, 36b, and 36c, while having a rectangular shape in the top view shown, have a cylindrical shape if looked at from a side view. Correspondingly, the lenses 50 and 51 are rectangular in shape when looked at from a side view. This occurs because each combination of the two lenses 50-51 and the two lenses 52-53 has a power in a separate one of the two orthogonal cross-sectional directions of the associated light beam 31a, 31b, or 31c. Still further, the lenses 50-53 in conjunction with lens 54 in each of the zoom lenses 36a, 36b, and 36c can be arranged in any combination or sequence that provides for the independent shaping of the input collimated light beam 31a, 31b, or 31c in the first and second orthogonal cross-sectional directions to produce a predetermined sized collimated light beam that is then selectively changed to a predetermined sized output light beam 31a, 31b, or 31c by the lens 54.

The collimated output light beams 31a and 31b from the first and second zoom lenses 36a and 36b, respectively, converge along first and second angularly separated paths and impinge the first dichroic beam combiner 38. The first dichroic beam combiner 38 is arranged to pass the light beam 31a from the zoom lens 36a and to reflect the light beam 31b from the zoom lens 36b so that both light beams are combined and propagate along a common path to the second dichroic beam combiner 39. The combined light beam from the first dichroic beam combiner 38 and the collimated light beam 31c from the third zoom lens 36c converge along separate paths and impinge the second dichroic beam combiner 39. The second dichroic beam combiner 39 is arranged to pass the combined light beam from the first dichroic beam combiner 38 and reflect the light beam 31c from the third zoom lens 36c so that both light beams are combined and propagate along a same path to the focusing lens arrangement 40. It is to be understood that any other suitable arrangement can be used to combine the light beams 31a, 31b, and 31c for delivery to the focusing lens arrangement 40.

Figure 1:
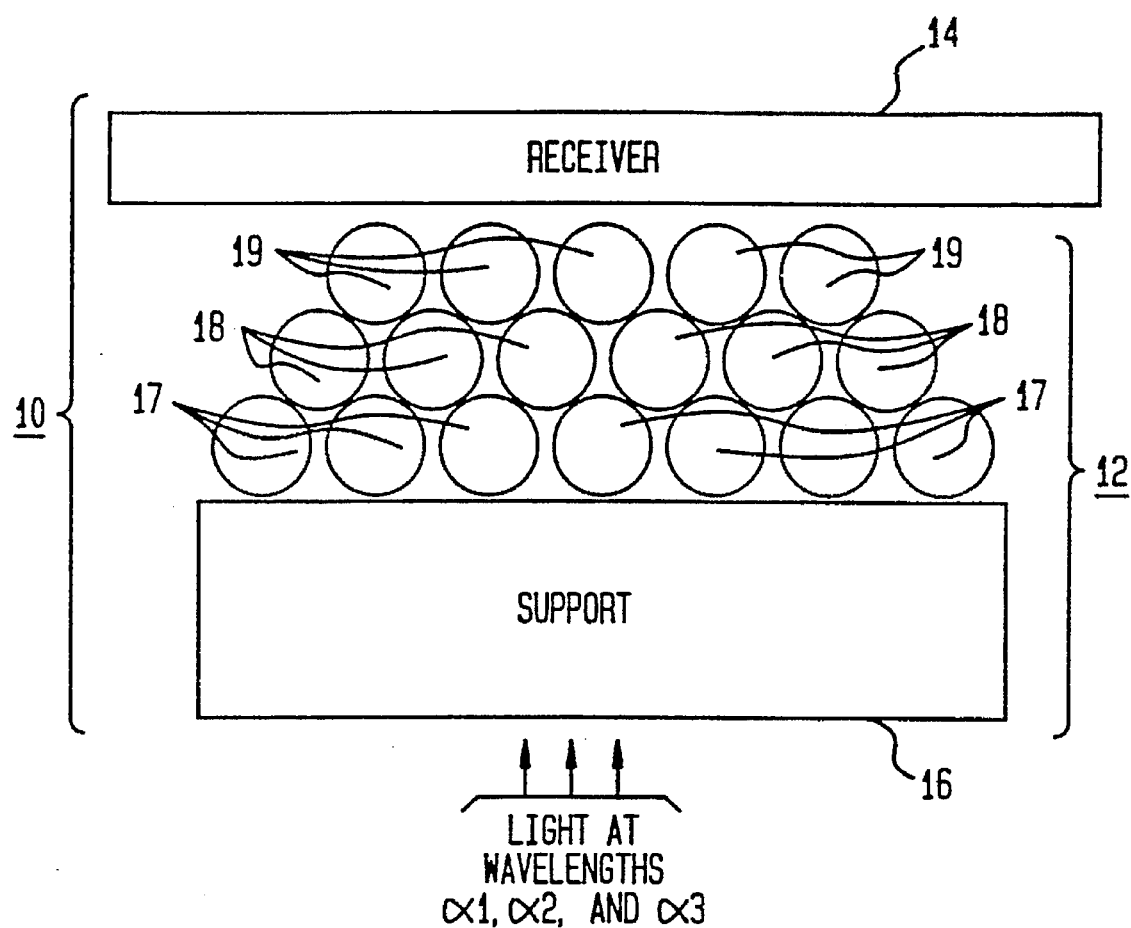
FIG. 1 shows an enlarged side view of a printing medium which is disclosed in U.S. patent application Ser. No. 992,235.

The focusing lens arrangement 40 comprises one or more lenses (not shown) for focusing the combined light beams 31a, 31b, and 31c from the second dichroic beam combiner 39 onto a printing media (not shown), such as the printing media 10 of FIG. 1, mounted on the drum 42. The combined and focused light beams 31a, 31b, and 31c are scanned across the printing media on the drum 42 by rotation of the drum 42 by the motor 43, and by the lateral movement of the drum 42 by movement of the leadscrew 46. The encoder 44 provides output control signals (pulses) using any technique well known in the art which indicate the radial position of the drum 42 as the drum 42 rotates.

The control section 24 comprises a microsystem 80 with a monitor 81, a VME bus 55, a sensors, switches, and calibration board 82, an input/output board 56, a data interface board 58, a channel board 60, a laser and cooler drivers board 62, a motor and leadscrew board 64, a Phase Lock Loop (PLL) 66, a leadscrew driver 68, and a motor driver 70. The microsystem and monitor 80 can comprise any suitable system such as a SunMicro System which automatically controls the operation of the control section 24 and the printing section 22 once predetermined functions and parameters for the laser printer 20 are entered by an operator. More particularly, prior to initiating a printing operation, an operator enters predetermined parameters for the laser printer 20 via a keyboard (not shown) of the microsystem 80. Once the printing operation is initiated, programs in the microsystem 50 use externally provided image data and the predetermined parameters while communicating with the various boards (e.g., boards 82, 56, 58, and 64) of the control section 24 via the VME bus 55 to control the printing operation of the laser printer 20.

The sensors, switches, and calibration board 54 mounts the necessary sensors (not shown) for detecting the status of various components in the control section 24, and the switches (not shown) and actuators (not shown) for changing the operation of predetermined components in the control section 24. The Input/Output board 56 uses the VME bus 55 to probe the various components on the boards 82, 58, and 64 to detect their status and change such status when necessary. More particularly, the Input/Output board 56 essentially operates as a "router" where input channels thereof probe a component on one of the boards to obtain its status (e.g., whether it is open or closed) and report such status back to either the microsystem 80 or the sensors, switches, and calibration board. Output channels (not shown) of the Input/Output board 56 function to react to commands from, for example, the microsystem 80 to change the status of an component on one of the boards 82, 58, or 64.

The motor and leadscrew board 64 receives control signals from either the microsystem 80 or the Input/Output board 56 to selectively activate each of the leadscrew 46 via the leadscrew driver 68, and the drum motor 43 via the motor driver 70. Separate control signals from each of the motor and leadscrew board 64 and the encoder 44 are processed in the PLL 66 to provide an output control signal to the data interface board 58.

The data interface board 58 receives (a) printing data from the microsystem 80 via the VME bus 55 relating to the parameters of the system and the color densities of the pixels to be printed on the printing media on the drum 42, and (b) control signals from the PLL 66. More particularly, the data interface board 58 comprises, for example, a line buffer (not shown), look-up tables (not shown), and frame timing and start of scan circuits (not shown). The data interface board 58 receives printing data from the microsystem 80, reconfigures the printing data to the form needed, and transmits the reconfigured printing data to the lasers 30a, 30b, and 30c via the channel board 60 and the laser and cooler drivers board 62 using the control signals from the PLL 66. The control signal from the PLL 66 is used by the data interface board 58 to synchronize the transmission of the printing data output signals to the channel board 60.

The channel board 60 receives the printing data from the data interface board 58 and separates the printing data for each of the lasers 30a, 30b, and 30c into a separate channel. Therefore, each channel is associated with a separate one of the lasers 30a, 30b, and 30c and includes different printing data signals and commands, with the same or different timing as that of other channels, to produce the color associated with that laser with a proper density at each pixel on the printing media mounted on the drum 42. The laser and cooler drivers board 62 includes a separate laser driver circuit (not shown) for each of the lasers 30a, 30b, and 30c and a separate cooler driver (not shown) for each of the coolers 32a, 32b, and 32c. Each of the laser drivers takes the command or control signals (e.g., 8-bit signals) for the associated laser from the channel board 60 and converts such command or control signals into voltages or currents for application to the associated laser. Each of the cooler drivers provides control signals to the associated cooler 32a, 32b, or 32c to prevent the associated laser 30a, 30b, or 30c, respectively, from getting too hot or too cold.

Figure 3:
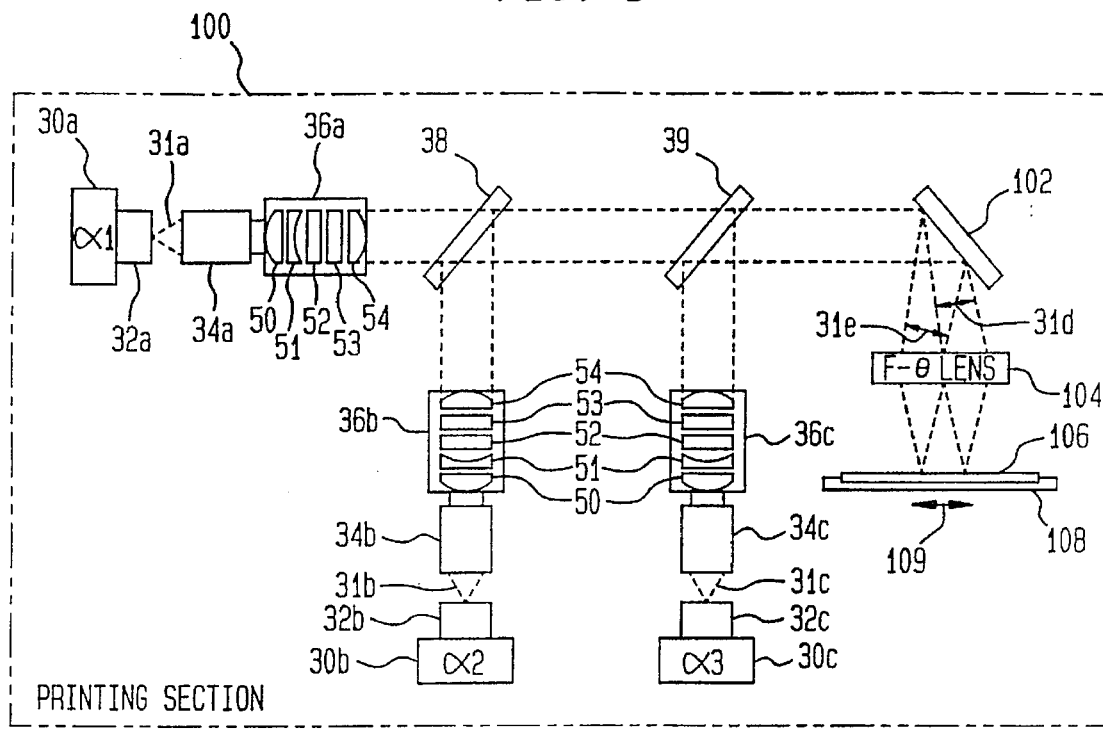
FIG. 3 shows a block diagram of an alternative printing section arrangement for use in the laser printer of FIG. 2 in accordance with a second embodiment of the present invention.

Referring now to FIG. 3, there is shown a block diagram of a printing section arrangement 100 (shown within a dashed line rectangle) in accordance with a second embodiment of the present invention which can be used in place of the printing section 22 in the laser printer 20 of FIG. 2. The printing section 100 comprises a plurality of three lasers 30a, 30b, and 30c adapted to generate modulated light beams 31a, 31b, and 31c, respectively, (shown as dashed line paths) at respective first ($\alpha$1), second ($\alpha$2), and third ($\alpha$3) different wavelengths, a plurality of three coolers 32a, 32b, and 32c, a plurality of three collimating lenses 34a, 34b, and 34c, a plurality of three zoom lenses 36a, 36b, and 36c, a first dichroic beam combiner 38, a second dichroic beam combiner 39, a scanning mirror 102, an F-$\theta$ scanning lens 104, a printing media 106, and a printing media holder 108 which is translationally movable in a direction parallel to the plane of the holder 108 and orthogonal to that shown by the double-ended arrow 109.

The lasers 30a, 30b, and 30c, the plurality of three coolers 32a, 32b, and 32c, the plurality of three collimating lenses 34a, 34b, and 34c, the plurality of three zoom lenses 36a, 36b, and 36c, the first dichroic beam combiner 38, and the second dichroic beam combiner 39 function as described for the corresponding elements of the printing section 22 of the laser printer 20 of FIG. 2. The resultant optically processed and combined light beams 31a, 31b, and 31c, at the output of the second dichroic beam combiner 39 are directed at the scanning mirror 102. The scanning mirror 102 is mounted on the shaft (not shown) of a galvanometer (not shown) and rotates or oscillates to provide linear deflection (scanning) of the combined light beams 31a, 31b, and 31c on the printing media 106 in a direction shown by double-headed arrow 109. It is to be understood that the galvanometer is activated by appropriate control signals from, for example, a scanning mirror driver (not shown) which replaces the motor driver 70 in the control section 24 shown in FIG. 2. The dashed line collimated beam 31d reflected from the scanning mirror 102 represents a first directional path of the reflected combined light beams 31a, 31b, and 31c for a first position of the oscillating scanning mirror 102. The dashed line collimated beam 31e reflected from the scanning mirror 102 represents a second directional path of the reflected combined light beams 31a, 32b, and 31c for a second position of the oscillating scanning mirror 102.

The combined collimated light beams 31a, 31b, and 31c reflected by the scanning mirror 102 impinge on the scanning lens 104 which is, for example, a well-known F-$\theta$ type scanning lens. More particularly, the F-$\theta$ scanning lens 104 is a spherical type lens that forms a spot (pixel) of a predetermined diameter on the plane of the printing media 106 for each of the combined light beams 31a, 31b, and 31c. The F-$\theta$ scanning lens 104 is a well-known multi-element lens which functions to provide distortions as a light beam is scanned in a predetermined direction that converts (a) all focal points from a curved line onto a straight line on the plane of the printing media 106, and (b) an equal angle $\theta$ for equal time into an equal height along the straight focal line for equal time.

More particularly, as a light beam is directed along a longitudinal axis of a normal focusing lens through such normal focusing lens, the light beam is focused to a focal point on the longitudinal axis on a focal surface which, for example, is tangent to a flat plane of a media surface such as printing media 106. As the light beam is scanned at an increased angle $\theta$ away from the longitudinal axis of the normal focusing lens, the focal points follow a curved line that moves increasingly away from the flat media surface. To overcome this effect, the F-$\theta$ scanning lens 104 provides a first distortion in a direction of scan (e.g., along arrow 109) to redirect each focal point from the curved line onto a straight line on the flat media surface as the angle $\theta$ increases. Secondly, when the focal points of a normal focusing lens are projected from the curved focal plane onto the flat plane of the printing media surface for equal increasing angles of $\theta$, the distances between spots projected on the flat plane increase. This occurs because the radial distance between the curve focal surface and the flat printing media surface increases as the angle $\theta$ increases. To overcome this effect, the F-$\theta$ scanning lens 104 introduces a second distortion that produces equal distances between focal points on the flat plane of the media surface for each degree of change of the angle $\theta$ away from the longitudinal axis of the scanning lens 104.

The combined light beams 31a, 31b, and 31c are focused by the scanning lens 104 on the printing media 106 and scanned along a line shown by the double-ended arrow 109. When a column of the image has been printed by one oscillation of the scanning mirror 102, the printing media holder 108 with the printing media 106 thereon is translated in a direction parallel to the plane of the holder 108 and orthogonal to that shown by the double-ended arrow 109 in order to print the second column. The pixels of the second column are registered adjacent to the pixels of the first column by appropriate movement of the holder 108 and the application of start of scan control signals (not shown) to the lasers 30a, 30b, and 30c and the scanning mirror 102 from the printing section 24 of FIG. 2. This process continues until all of the remaining columns of the multicolor image have been printed on the printing media 106. The printing section 100 differs from the printing section 22 of FIG. 2 in that the printing section 100 is a flying spot printing type that uses a rotating or oscillating mirror 102 and an F-θ scanning lens 104 to provide a fast scan of the independently optically processed and combined light beams 31a, 31b, and 31c over a flat oriented printing media 106.

Figure 4:
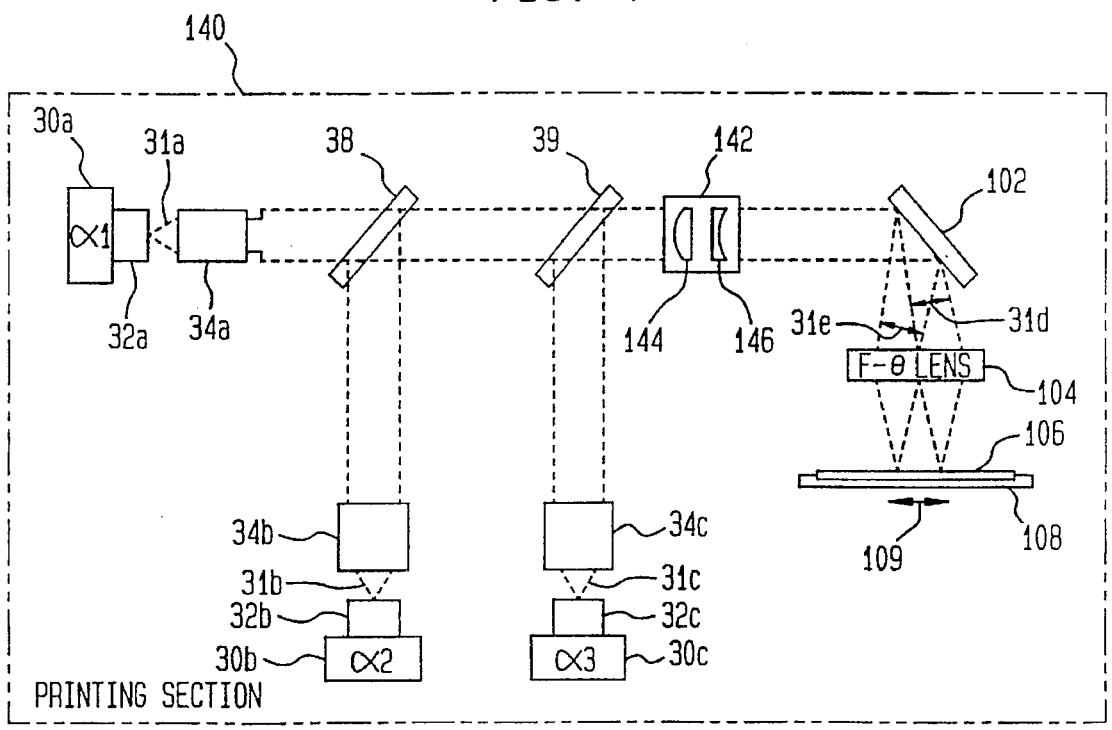
FIG. 4 shows a block diagram of an alternative printing section arrangement for use in the laser printer of FIG. 2 in accordance with a third embodiment of the present invention.

Referring now to FIG. 4, there is shown a block diagram of a printing section 140 (shown within a dashed line rectangle) in accordance with a third embodiment of the present invention which can be used in place of the printing section 22 in the laser printer 20 of FIG. 2. The printing section 140 comprises a plurality of three single mode lasers 30a, 30b, and 30c adapted to generate modulated light beams 31a, 31b, and 31c, respectively, (shown as dashed line paths) at respective first (α1), second (α2), and third (α3) different wavelengths, a plurality of three coolers 32a, 32b, and 32c, a plurality of three collimating lenses 34a, 34b, and 34c, a first dichroic beam combiner 38, a second dichroic beam combiner 39, an achromatized beam shaper 142, a scanning mirror 102, an F-θ scanning lens 104, a printing media 106, and a printing media holder 108 which is translationally movable in a direction parallel to the plane of the holder 108 and orthogonal to that shown by the double-ended arrow 109. The difference between the printing section 140 and the printing section 100 of FIG. 3, is that the zoom lenses 36a, 36b, and 36c of the printing section 100 have been replaced by the achromatized beam shaper 142 located between the second dichroic beam combiner 39, and the scanning mirror 102. In the printing section 140, the divergence variations in the individual lasers 30a, 30b, and 30c are not corrected by the use of zoom lenses. The printing section 140 is used, for example, when the single mode lasers 30a, 30b, and 30c are substantially matched and/or there is no need or requirement for compensating or correcting for astigmatism or divergence differences of the light beams 31a, 31b, and 31c.

The single mode lasers 30a, 30b, and 30c, the plurality of three coolers 32a, 32b, and 32c, the plurality of three collimating lenses 34a, 34b, and 34c, the first dichroic beam combiner 38, and the second dichroic beam combiner 39, the scanning mirror 102, and the F-θ scanning lens 104 function as described for the corresponding elements of the printing section 100 of FIG. 3. The resultant collimated and combined light beams 31a, 31b, and 31c at the output of the second dichroic beam combiner 39 are directed at the achromatized beam shaper 142. The beam shaper 142 comprises a first cylindrical convex lens 144 and a second cylindrical concave lens 146 which, in combination, provide light beam shaping optics for changing an aspect ratio thereof in one of two orthogonal cross-sectional directions of the light beam passing therethrough. For example, the arrangement of printing section 140 is used when the elliptically combined beams 31a, 31b, and 31c from the second dichroic beam combiner 39 have a same or proper correct size in one of the two orthogonal cross-sectional directions of the combined light beams 31a, 31b, and 31c but do not have a proper same or desired correct size in the other orthogonal cross-sectional direction. This occurs because the collimated light beams 31a, 31b, and 31c are highly elliptical. Therefore, the achromatized beam shaper 142 functions to reshape the combined light beams 31a, 31b, and 31c in only the above-mentioned other cross-sectional direction to change the highly elliptical beams 31a, 31b, and 31c into circular or less elliptical combined light beams. The combined light beams 31a, 31b, and 31c from the achromatized beam shaper 142 are directed as one light beam onto the scanning mirror 102.

The scanning mirror 102 is mounted on the shaft (not shown) of a galvanometer (not shown), and rotates or oscillates to provide linear deflection (scanning) of the combined light beams 31a, 31b, and 31c over the printing media 106 in a direction shown by double-headed arrow 109. The dashed line collimated beam 31d reflected from the scanning mirror 102 represents a first directional position of the reflected combined light beams 31a, 31b, and 31c for a first position of the oscillating scanning mirror 102. It is to be understood that the galvanometer is activated by appropriate control signals from, for example, a scanning mirror driver (not shown) which replaces the motor driver 70 in the control section 24 shown in FIG. 2. The dashed line collimated beam 31e reflected from the scanning mirror 102 represents a second directional position of the reflected combined light beams 31a, 31b, and 31c for a second position of the oscillating scanning mirror 102.

The combined collimated light beams 31a, 31b, and 31c reflected by the scanning mirror 102 along the scanning direction 109 impinge on the F-θ scanning lens 104. The combined light beams 31a, 31b, and 31c are focused by the scanning lens 104 onto the flat surface of the printing media 106 and scanned along a line shown by the double-ended arrow 109. When a column of the image has been printed by one oscillation of the scanning mirror 102, the printing media holder 108, with the printing media 106 thereon, is translated in a direction parallel to the plane of the holder 108 and orthogonal to that shown by the double-ended arrow 109 in order to print the second column. The pixels of the second column are registered adjacent to the pixels of the first column by appropriate movement of the holder 108, and a timely application of start of scan control signals (not shown) to the lasers 30a, 30b, and 30c and the scanning mirror 102 from the printing section 24 of FIG. 2. This process continues until all of the remaining columns of the multicolor image are printed on the printing media 106.

Figure 5:
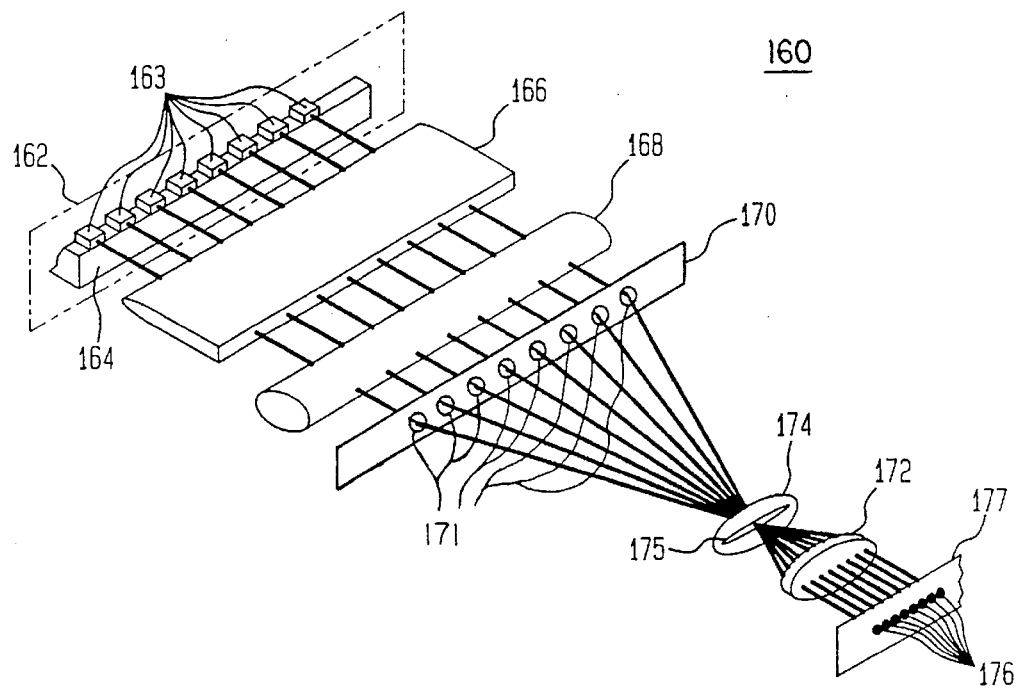
FIG. 5 shows a prior art printing section including an array of multi-spatial or single-spatial mode lasers whose light beam is focused onto a printing media by an optical arrangement.

Referring now to FIG. 5, there is shown a view in perspective of an optical printing section 160 disclosed in U.S. patent application Ser. No. 986,207 (assigned to the present assignee), filed on Dec. 7, 1992, for use in a laser thermal printer. The printing section 160 comprises a laser diode array 162 (shown within a dashed-line rectangle), a first cylinder lens 166 having a first high numerical aperture (NA), a second cylinder lens 168 having a second low NA, a micro lenslet array 170, and a printing lens 172. The laser diode array 162 is a multimode laser diode array comprising a plurality of independently modulated laser diode sources 163 formed on a substrate 164. Each laser diode source 163 comprises either a single laser or an ensemble of diode lasers (not shown). Within each ensemble, the diode lasers of a source 163 are pumped as one group. Even though each one of the diode lasers within an ensemble of a source 163 is a single mode laser, the source 163 is essentially a multimode laser since no attempt is made at optically coupling the diode lasers in the ensemble of the source 163. The diode lasers making up a source 163 can be packed close to each other to form a source size of typically 100 to 200 microns in an array direction, or be spaced at equal distances within the source 163. In a cross-array direction, the size of the light source 163 is typically in the submicron range. The larger the size of a light source 163 in the array direction, the more power it can deliver. To achieve high power from the laser diode array 162, the number of light sources 163 needs to be as high as possible. However, since the size of the laser diode array 162 is limited typically to approximately twelve millimeters, having a large number of independent light sources 163 results in the light sources 163 being too closely spaced. This causes unwanted cross-talk which is in the form of electrical, thermal, and possible optical cross-talk which causes one channel to affect the other. Therefore, to avoid cross-talk, the laser diode array 162 has, for example, a total size in the array direction of twelve millimeters and comprises between five to twenty independently modulated light sources 163 with distances therebetween of approximately 2000 to 500 microns, respectively.

In the optical arrangement 160, the diverging modulated light beams having predetermined intensities from the laser diode sources 163 of the laser diode array 162 are intercepted by the first cylinder lens 166 which preferably has a high numerical aperture (NA). Although the first lens 166 is designated as a cylinder lens, it is to be understood that the first lens 166 can have a cylinder or a hyperbolic surface. Cylinder lens 166 is used to reduce the numerical aperture (NA) from, for example, 0.5 to 0.1. The second cylinder lens 168 (having a low NA) is positioned in the direction of a width of the laser diode array 162 (e.g., along the line of diode laser sources 13) to further modify the light beams from the laser diode array 162 and focus each of the substantially parallel light beams leaving the second cylinder lens 168 at a plane of the entrance pupil 174. The entrance pupil 174 is located in a front focal plane of the printing lens 172. The lenslet array 170 intercepts the light beams from the second cylinder lens 166, and focuses and overlaps each of the light beams from the laser sources 163 at a slit 175 in the entrance pupil 174 in the direction of the laser diode array 162. The lenslets are shown schematically by small circles 171. The printing lens 172 then images the laser diode array 162 represented by the light beams at the entrance pupil 174 onto the light sensitive printing media 177 to form a line of closely spaced spots (pixels) 176 of predetermined intensities.

Figure 6:
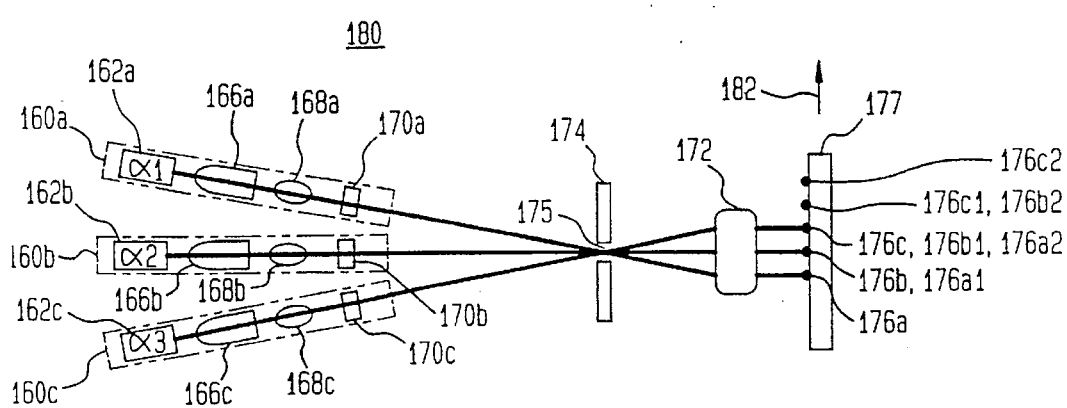
FIG. 6 shows a block diagram of an alternative printing section arrangement combining three of the prior art arrangements shown in FIG. 5 for use in the laser printer of FIG. 2 in accordance with a fourth embodiment of the present invention.

Referring now to FIG. 6, there is shown a block diagram of an printing section 180 which combines three of the prior art printing sections 160 shown in FIG. 5 for use in the laser printer of FIG. 2 in accordance with a fourth embodiment of the present invention. More particularly, the printing section 180 comprises a first laser/optical section 160a (shown within a dashed line rectangle), a second laser/optical section 160b (shown within a dashed line rectangle), a third laser/optical section 160c (shown within a dashed line rectangle), and a printing lens 172 having an entrance pupil 174 is located in a front focal plane thereof.

The first laser/optical section 160a comprises a laser array 162a which generates an output light beam of a first wavelength α1, a first cylinder lens 166a having a high numerical aperture (NA), a second cylinder lens 168a having a low NA, and a micro lenslet array 170a which function as described for corresponding elements in the printing section 160 of FIG. 5. The second laser/optical section 160b comprises a laser array 162b which generates an output light beam of a second wavelength α2, a first cylinder lens 166b having a high numerical aperture (NA), a second cylinder lens 168b having a low NA, and a micro lenslet array 170b which function as described for corresponding elements in the printing section 160 of FIG. 5. The third laser/optical section 160c comprises a laser array 162c which generates an output light beam of a third wavelength α3, a first cylinder lens 166c having a high numerical aperture (NA), a second cylinder lens 168c having a low NA, and a micro lenslet array 170c which function as described for corresponding elements in the printing section 160 of FIG. 5.

The optically processed light beams at the three different wavelengths α1, α2, and α3 from the laser/optical sections 160a, 160b, and 160c, respectively, are each focused at the slit 175 of the entrance pupil 174 located in a front focal plane of the printing lens 172. The printing lens 172 then images each of the laser diode arrays 162a, 162b, and 162c (represented by their light beams at the entrance pupil 174) onto a light sensitive printing media 177 to form a separate line of closely spaced spots 176a, 176b, and 176c, respectively, of predetermined intensities for each of the different wavelength light beams. It is to be understood that the line of dots 176a, 176b, and 176c simultaneously produced by each of the laser arrays 162a, 162b, and 162c, respectively, are directed in a line orthogonal to the plane of the paper showing FIG. 6.

It is to be understood that during a multicolor image printing operation with the printing section 180, a first line of dots (pixels) 176a of the color associated with the wavelength α1, a second line of dots (pixels) 176b of the color associated with the wavelength α2, and a third line of dots (pixels) 176c of the color associated with the wavelength α3 are simultaneously printed parallel to each other on the printing media 177 by the light beams from the laser arrays 162a, 162b, and 162c, respectively. The printing media 177 is then moved relative to the light beams from the laser arrays 162a, 162b, and 162c in the direction of arrow 182 by an electronically monitored motion of a drum or platen (not shown), or any other suitable technique, until the new line of dots 176a1 is properly registered with the line of dots 176b previously printed, the new line of dots 176b1 is properly registered on the line of dots 176c previously printed, and a new second line of dots 176c1 is properly registered. The laser arrays 162a, 162b, and 162c are then enabled to generate their associated light beams at the three different wavelengths in order to print the associated colored pixel rows 176a1, 176b1, and 176c1. The printing media 177 is again moved relative to the light beams from the laser arrays 162a, 162b, and 162c in the direction of arrow 182 until the new line of dots 176a2 is properly registered with the line of dots 176b1, the new line of dots 176b2 is properly registered on the line of dots 176b1, and a new third line of dots 176c2 is properly registered. The laser arrays 162a, 162b, and 162c are then enabled to generate their associated light beams at the three different wavelengths in order to print the associated colored pixel rows 176a2, 176b2, and 176c2. The process continues until all of the lines of dots for the multicolor image have been printed.

It is to be understood that the closer the laser/optical sections 160a, 160b, and 160c are positioned adjacent to each other the closer the line of dots 176a, 176b, and 176c will be located on the printing media 177. Furthermore, it is also possible to combine the angularly separated light beams from the laser/optical sections 160a, 160b, and 160c by any suitable optical arrangement so that the light beams therefrom overlap each other at the printing media 177. This will prevent the need for registering the optical arrangement generated overlapping dots 176a, 176b, and 176c as the printing media 177 is translated. It is further understood that the three laser arrays 160a, 160b, and 160c can be oriented relative to each other in any suitable manner with or without further optics (such as dichroic beam combiners 38 and 39 of FIG. 2, 3, or 4) to properly orient the light beams 31a, 31b, and 31c onto the printing lens 172. Still further, the laser arrays 160a, 160b, and 160c can be combined into a single array (not shown) comprising laser with different wavelengths α1, α2, and α3 interspersed therein in any arrangement.

It is to be appreciated and understood that the specific embodiments of the invention described hereinabove are merely illustrative of the general principles of the invention. Various modifications may be made by those skilled in the art which are consistent with the principles set forth. For example, the control section 24 shown in FIG. 2 depicts an exemplary control section for generating control signals for the printing section 22. It is to be understood that any suitable control section 24 arrangement can be used for providing the necessary control signals to the lasers 30a, 30b, and 30c of FIGS. 2-5, or the laser arrays 162a, 162b, and 162c of FIG. 6, for printing a multicolor image on a printing media using optical arrangements shown in any one of the FIGS. 2, 3, 4, and 6. Still further, the scanning mirror 102 shown in FIGS. 3 and 4 can be replaced by a rotating mirror, a polygon system, a hologon system, or any other suitable arrangement to scan the combined light beams 31a, 31b, and 31c over the printing media 106. It is to be understood that the printing sections 22, 100, 140, and 180 of FIGS. 2, 3, 4, and 6, respectively, can be used for all different types of digital imaging such as, but not limited to, half-tone, continuous tone, or hybrid imaging.

What is claimed is:

1. A laser color printer for printing a multicolor image on a light-sensitive color printing medium having a surface that is responsive to separate wavelengths of light for each different color printed thereon comprising:

a plurality of laser diode arrays, each of said laser diode arrays generating light beams of different wavelengths, each of said laser diode arrays comprising a plurality of diode lasers with each of said diode lasers of a laser diode array generating a separate diverging light beam of a predetermined substantially same wavelength; and an optical system comprising:

a) a first optical means for shaping the light beams into beams of a predetermined cross-sectional size and directing said light beams so that said light beams intersect at a common location, said first optical means having a plurality of lenses, each of said lenses receiving the light beams from a separate one of the plurality of diode arrays; and b) second optical means for creating a plurality of small discrete spots on the surface of the printing medium, said second optical means comprising a focusing lens receiving said light beams from the first optical means and focusing the light beams onto the surface of the printing media, said focusing lens having an entrance pupil positioned at said common location for receiving all of said shaped beams prior to impinging on said focusing lens.

2. The laser color printer of claim 1 wherein:

each of said plurality of lenses of said first optical means receiving the light beams from a separate one of the diode lasers and reducing the divergence of each of the light beams from that diode laser by a predetermined mount, and continuing the direction of the light beams towards the entrance pupil of the focusing leas; and said first optical means further includes a plurality of a monolithic lenslet arrays, each of said lenslet arrays receiving the light beams from a separate one of the plurality of lenses and comprising a separate lenslet for each of the diode lasers of a separate one of the laser diode arrays for redirecting and focusing each of the light beams at a common area of the entrance pupil.

3. The laser color printer of claim 2 wherein small discrete spots produced for the plurality of diode lasers are aligned parallel to each other with a predetermined spacing therebetween.

4. A laser color printer for printing a multicolor image on a light-sensitive color printing medium that is responsive to different wavelengths of light for each different color printed thereon comprising:

a plurality of laser sources, each of said plurality of laser sources generating a diverging light beam characterized by a wavelength, the wavelength of said light beam being different from the wavelength of at least another light beam of said plurality of laser sources; and an optical system comprising:

a) a plurality of collimating lenses, each of said plurality of collimating lenses receiving only the light beam from a separate one of the plurality of laser sources for collimating the received light beam into a beam of a predetermined cross-sectional size in a first direction and of a predetermined cross-sectional size in a second direction, said directions being orthogonal of the received light beam, wherein an optical path length from each of said collimating lenses to said light-sensitive printing medium is of constant length; and b) a plurality of zoom lenses, each of said zoom lenses receiving a respective collimated light beam only from a respective separate one of the plurality of collimating lenses and independently and selectively adjusting the received collimated light beam in each of the first and second orthogonal directions to a predetermined sized collimated output light beam that matches other collimated output light beams from all others of said zoom lenses to selectively control a spot size at each of said different wavelengths on the printing medium for maximizing efficiency of image transfer of each color for said multicolor image;

a plurality of beam combiners receiving and combining the matched collimated output light beams from the plurality of zoom lenses for travel along a common path; and a lens receiving the combined light beam from the plurality of beam combiners and focusing the light beams onto a surface of said light-sensitive printing medium.

* * * * *